United States Patent
Hori et al.

(10) Patent No.: US 6,221,465 B1
(45) Date of Patent: Apr. 24, 2001

(54) FILM FOR DECORATIVE SHEET AND DECORATIVE SHEET COMPRISING THE SAME

(75) Inventors: Kazuya Hori; Ken Furuya, both of Aichi (JP)

(73) Assignee: Mitsubishi Chemical MKV Company, Tokyo (JP)

( * ) Notice: Subject to any disclaimer, the term of this patent is extended or adjusted under 35 U.S.C. 154(b) by 0 days.

(21) Appl. No.: 09/196,139

(22) Filed: Nov. 20, 1998

(30) Foreign Application Priority Data

Nov. 21, 1997 (JP) .................................................. 9-320991
Nov. 21, 1997 (JP) .................................................. 9-320992

(51) Int. Cl.$^7$ ................................. B32B 27/14; B32B 3/00
(52) U.S. Cl. ........................... 428/195; 428/213; 428/207; 428/343; 428/523; 428/220
(58) Field of Search ................................. 428/41.3, 41.6, 428/42.1, 195, 523, 206, 207, 343, 354, 220

(56) References Cited

U.S. PATENT DOCUMENTS

| 5,622,760 | * | 4/1997 | Leiss | 428/41.3 |
| 5,668,199 | * | 9/1997 | Suhadolnik et al. | 524/99 |
| 5,770,643 | * | 6/1998 | Wehner et al. | 524/91 |
| 5,804,622 | * | 9/1998 | Zinke et al. | 524/100 |
| 5,814,688 | * | 9/1998 | Hilti et al. | 524/9 |
| 5,955,517 | * | 9/1999 | Hilti et al. | 524/9 |

FOREIGN PATENT DOCUMENTS

| 6-198830 | | 7/1994 | (JP) . |
| 6-198831 | | 7/1994 | (JP) . |
| 8-1881 | | 1/1996 | (JP) . |
| 10-245458 | * | 9/1998 | (JP) . |

* cited by examiner

Primary Examiner—Bruce H. Hess
Assistant Examiner—B. Shewareged
(74) Attorney, Agent, or Firm—Oblon, Spivak, McClelland, Maier & Neustadt, P.C.

(57) ABSTRACT

A film for a decorative sheet comprising a polyolefin and a benzotriazole ultraviolet absorber, said bensotriazole ultraviolet absorber having a molecular weight of 380 to 1000 and/or a vapor pressure of not higher than $1 \times 10^{-8}$ mmHg (absolute pressure) at 20° C. Also disclosed are a decorative sheet and a decorative material comprising the film. The film is free from blooming and hardly undergoes fading or deterioration by light.

16 Claims, No Drawings

FILM FOR DECORATIVE SHEET AND DECORATIVE SHEET COMPRISING THE SAME

FIELD OF THE INVENTION

This invention relates to a plastic decorative sheet for decorative materials, such as a plastic decorative laminate and a plastic-coated steel plate, which are used for furniture, constructional interior materials, and the like.

BACKGROUND OF THE INVENTION

Decorative materials such as plastic decorative laminates are generally comprising a substrate, such as plywood or steel, overlaid with a decorative sheet having a single printed and/or colored film or a laminate thereof. The laminate type decorative sheet usually comprises a transparent surface layer and a printed and/or colored layer, which are bonded with each other via, if necessary, an adhesive layer. The decorative sheet is used in the form of a laminate on a substrate such as plywood with an adhesive layer therebetween.

The surface layer or the printed and/or colored layer usually contains an ultraviolet absorber (UV absorber) as a weatherability assistant to prevent the printed and/or colored layer from fading or to prevent the whole sheet from deterioration by light during use.

Vinyl chloride resins have been used widely as a base resin of the decorative sheet for their, excellent design properties and proccessability but have recently been being replaced with polyolefin resins from considerations of hydrogen chloride gas by-produced in thermal disposal after use and the material of incinerators. Being nonpolar, however, polyolefin resins have poor compatibility with UV absorbers, which have high polarities. Therefore, if an UV absorber is added to polyolefin resins in an amount effective for preventing fading or deterioration, cases are often met with in which the UV absorber blooms to the surface of the decorative sheet during sheet formation or subsequent fabrication, which not only deteriorates the appearance of the decorative sheet but also contaminates equipment such as a mold and rolls. Further, the UV absorber tends to fail to accomplish its object due to the blooming loss.

SUMMARY OF THE INVENTION

Accordingly, an object of the present invention is to provide a polyolefin-based film for a decorative sheet (hereinafter simply referred to as a polyolefin film) which is free from the above-described disadvantages, i.e., a polyolefin film which is protected against fading or deterioration by light while suppressing blooming of an UV absorber incorporated therein.

Another object of the present invention is to provide a decorative sheet having the polyolefin film, and a decorative material having the decorative sheet.

Other objects and effects of the present invention will become apparent from the following description.

The above described objects of the present invention have been achieved by providing a polyolefin film containing a benzotriazole UV absorber having a specific molecular weight or a specific vapor pressure. That is, the present invention relates to the following films, decorative sheets and decorative materials.

(1) A film for a decorative sheet comprising a polyolefin and a benzotriasole ultraviolet absorber having a molecular weight of from 380 to 1000.

(2) The film according to the above (1), wherein said benzotriazole ultraviolet absorber has a molecular weight of from 380 to 600.

(3) A film for a decorative sheet comprising a polyolefin and a benzotriazole ultraviolet absorber having a vapor pressure of not higher than $1 \times 10^{-8}$ mmHg (absolute pressure) at 20° C.

(4) The film according to the above (1) or (3), wherein the temperature at which the rate of thermogravimetric change of said benzotriazole ultraviolet absorber reaches 1% is 200° C. or higher.

(5) The film according to any one of the above (1) to (4)# wherein said polyolefin is a polypropylene resin.

(6) The film according to any one of the above (1) to (5), wherein said benzotriazole ultraviolet absorber is present in an amount of from 0.01 to 10 parts by weight per 100 parts by weight of the polyolefin.

(7) The film according to any one of the above (1) to (6), further containing a hindered amine light stabilizer.

(8) The film according to the above (7), wherein said hindered amine light stabilizer is present in an amount of from 0.01 to 10 parts by weight per 100 parts by weight of the polyolefin.

(9) The film according to the above (7) or (8), wherein said hindered amine light stabilizer has a molecular weight of 1000 or more.

(10) The film according to the above (7) or (8), wherein said hindered amine light stabilizer is a polyethylene resin having copolymerized with 1 to 10% by weight of a hindered amine light stabilizer having an unsaturated group.

(11) The film according to any one of the above (1) to (10), having a thickness of from 0.05 to 1 mm.

(12) A decorative sheet comprising a printed film which comprises a film according to any one of the above (1) to (11) and one surface of which is printed.

(13) a decorative sheet comprising a colored film which comprises a film according to any one of the above (1) to (11).

(14) A decorative sheet which comprises a film according to any one of the above (1) to (11) having provided thereon an adhesive layer and a layer subjected to at least one of printing and coloring.

(15) A decorative material which comprises a substrate having provided thereon an adhesive layer and a decorative sheet according to any one of the above (12) to (14).

According to the present invention, since blooming of the UV absorber is suppressed, the film for a decorative sheet exhibits UV absorbing performance of long duration and therefore hardly undergoes fading or deterioration by light or increase in haze.

DETAILED DESCRIPTION OF THE INVENTION

The polyolefin for used in the present invention includes polyethylene resins and polypropylene resins. The term "polyethylene resins" or "polypropylene resins" as used herein is intended to include not only an ethylene or propylene homopolymer but a copolymer mainly comprising ethylene or propylene and a mixture of two or more thereof.

Of the polyolefins preferred are polypropylene resins. Random copolymers comprising propylene and at least one olefinic monomer selected from ethylene and α-olefins having 4 to 12 carbon atoms are particularly preferred. In such random copolymers the olefinic monomer in irregularly distributed in polypropylene molecules to disturb the stereoregularity, i.e., to reduce the crystallinity. That is, the random copolymers are excellent in transparency and flexibility. A preferred olefinic monomer content in the random copolymer is 1 to 10% by weight, particularly 2 to 6% by weight.

The film for a decorative sheet according to the present invention contains a benzotriasole UV absorber which less colors the polyolefin film than a benzophenone UV absorber and is therefore suitable for use in a decorative sheet or a layer constituting a decorative sheet.

The benzotriazole UV absorber for use in the present invention has a molecular weight of from 360 to 1,000 and/or a vapor pressure of not higher than $1 \times 10^{-8}$ mmHg (absolute pressure) at 20° C.

If the molecular weight is less than 380, the expected non-blooming properties cannot be obtained. A benzotriazole UV absorber having a molecular weight exceeding 1,000 tends to bloom due to insufficient compatibility with the polyolefin, or is difficult to incorporate into the polyolefin in an amount sufficient to produce its effect. A preferred molecular weight is from 380 to 800, particularly from 380 to 600. As far as the vapor pressure at 20° C. is in the above range, the desired effect in preventing blooming is obtained. Further, a benzotriazole UV absorber which has a temperature at which the rate of the thermogravimetric change thereof reaches 1% of 200° C. or higher is particularly preferred because it maintains non-blooming properties even under processing conditions. The "rate of thermogravimetric change thereof" as used herein means a rate of the change in the weight of a substance measured by thermogravimetric analysis under air current at a temperature increasing rate of 20° C./min using a thermogravimeter.

Specific examples of the benzotriazole UV absorbers which meet at least one of the above-described requirements include 2-[2'-hydroxy-3'-(3",4",5",6"-tetrahydrophthalimidomethyl)-5'-methylphenyl]benzotriazole (molecular weight: 388), 2-[2-hydroxy-3,5-bis(α,α-dimethylbenzyl)phenyl]-2H-benzotriazole (molecular weight: 449, vapor pressure (20° C.) $2 \times 10^{-10}$ mmHg temperature at which thermogravimetric change reaches 1%: 263° C.), and 2,2-methylenebis[4-(1,1,3,3-tetramethylbutyl-6-(2H-benzotriazol-2-yl)phenol] (molecular weight: 659, vapor pressure (20° C.): $3.6 \times 10^{-14}$ mmHg, temperature at which thermogravimetric change reaches 1%: 315° C.).

The bensotriazole UV absorber is preferably used in an amount of 0.01 to 10 parts by weight, still preferably 0.05 to 5 parts by weight, per 100 parts by weight of the polyolefin. If the amount of the UV absorber is less than 0.01 part, the effect in preventing fading and deterioration tends to be insufficient. If it exceeds 10 parts, no further appreciable improving effect is obtained, and blooming can result.

The film preferably contains a hindered amine type light stabilizer to prevent deterioration of the polyolefin itself. From the viewpoint of light stabilization and prevention of blooming, the hindered amine light stabilizer is preferably added in an amount of 0.01 to 10 parts by weight per 100 parts by weight of the polyolefin. From the standpoint of non-blooming properties of the hindered amine light stabilizer itself, those having a molecular weight of 1000 or more, such as a butanedloic acid,dimethylester,polymer with 4-hydroxy-2,2,6,6-tetramethyl-1-piperidine ethanol (molecular weight: 3100 to 4000) and poly[{6-(1',1,3,3-tetramethylbutyl)amino-1,3,5-triazine-2,4-diyl)}{(2,2,6,6-tetramethyl-4-piperidyl)imino}hexamethylene{(2,2,6,6-tetramethyl-4-piperidyl)imino}] (molecular weight 2000 to 3100); and a polyethylene resin with which a hindered amine light stabilizer having an unsaturated group is copolymerized are particularly preferred. The polyethylene resin having the hindered amine light stabilizer copolymerized therewith preferably has a melt flow rate (MFR) of 0.1 to 5 (g/10 min) for the compatibility with the base resin.

If desired, the film for a decorative sheet can contain various additives, such as antioxidants, slipping agents, coloring agents, fillers, and nucleating agents, in amounts that do not impair the effects of the present invention. These additives are usually added by masterbatching using a polyolefin resin as a matrix.

The process for preparing the film of the present invention is not particularly limited, and any film forming method known for polyolefins, such as T-die extrusion, blown film extrusion and calendering, can be employed.

The thickness of the film for a decorative sheet preferably ranges from about 0.5 to 1 mm from the standpoint of strength of the whole decorative sheet, post-processing or ease in handling, while varying depending on whether it serves as a surface layer or a printed and/or colored layer or the layer structure of the decorative sheet in which it is used.

Since the film for a decorative sheet satisfactorily holds the above-described UV absorbr, when an adhesive layer is laminated thereon, the adhesive layer hardly undergoes deterioration or delamination.

The film of the present invention per se can be printed and/or colored to provide a decorative sheet of a single layer structure. Printing of the film can be carried out by applying printing ink by means of a coater, etc. In this case, the printing may be preceded, as needed, by a primer treatment onto the surface of the film to be printed. Coloring of the film can be effected by compounding the base resin with a coloring agent such as a dye or a pigment.

Alternatively, the decorative sheet of the present invention may be a laminate type sheet prepared by using the film according to the invention as a surface layer and successively laminating an adhesive layer and a printed and/or colored layer. In this case, the printed and/or colored layer may also comprise the film according to the present invention. The method for preparing the laminate type decorative sheet includes co-extrusion of the constituting layers, contact or fusion bonding of the constituting layers upon formation the respective layer, and laminating, by means of a laminator and the like, the constituting layers previously formed separately. In addition, the adhesive layer may be provided by applying a liquid or pasty adhesive to the film with a coater.

A decorative material can be produced by successively laminating an adhesive layer and a substrate on the resulting decorative sheet. As needed, a primer can be applied to one side of the decorative sheet prior to the lamination of the adhesive layer. The substrate includes wood, such as plywood, and a steel plate.

The present invention will now be illustrated in greater detail with reference to the following Examples, but the present invention should not be construed as being limited thereto. Unless otherwise indicted, all the parts are given by weight.

EXAMPLES 1 TO 3 AND COMPARATIVE EXAMPLES 1 AND 2

Preparation of Film

A composition having the following formulation was extruded from a T-die-extruder (diameters 40 mm; die width: 400 mm) at a die temperature of 220° C. to obtain a transparent film having a thickness of 100 μm.

Formulations:

| | |
|---|---|
| Polypropylene resin (random polypropylene, comonomer: ethylene, MFR: 10 g/10 min, heat of crystal fusion: 96 J/g, melting point: 144° C. (measured at a temperature increasing rate of 10° C./min)) | 100 parts |
| UV-absorber* (see Table 1) | 0.6 part |
| Hindered amine light stabilizer** (see Table 1) | 0.2 part |

UV-Absorber*
I: 2-[2-Hydroxy-3,5-bis(α,α-diemthylbenzyl)phenyl]-2H-benzotriazole
II: Hydrozyphenylbenzotriazole derivative (Tinuvin 571, produced by Chiba-Geigy)
III: 2,2-methylenebis(4-(1,1,3,3-tetramethylbutyl-6-(2H)-benzotriazol-2-yl) phenol]
IV: 2-(3,5-Di-t-butyl-2-hydroxyphenyl)benzotriazole
V: 2-(3,5-Di-t-amyl-2-hydroxyphenyl)benzotriazole
Hindered Amine Light Stabilizer**
A: Butanedioic acid, dimethylester, polymer with 4-hydroxy-2,2,6,6-tetramethyl-1-piperidine ethanol
B: Hindered amine light stabilizer (5 wt %)-copolymerized polyethylene (MFR: 1 g/10 min)

The resulting film was evaluated as follows. The results obtained are shown in Table 1.

Evaluation

1) MFR

Measured in accordance with JIS K 6758 (and JIS K 7210).

2) Haze

Measured in accordance with JIS K 7105 (clouded value) immediately after the film formation and after storage at 80° C. for 7 days.

3) UV Absorption

The UV absorbance at 250 to 400 nm was measured with a spectrophotometer (model U-330, manufactured by Hitach, Ltd.) immediately after the film formation and after storage at 80° C. for 7 days, and a UV absorbance retention (%) was determined.

TABLE 1

| | Example | | | Comparative Example | |
|---|---|---|---|---|---|
| | 1 | 2 | 3 | 1 | 2 |
| UV Absorber | | | | | |
| Kind | I | II | III | IV | V |
| Mol. Wt. | 448 | 394 | 559 | 323 | 352 |
| Vapor Pressure (mmHg); 20 C. | $2 \times 10^{-10}$ | $1.2 \times 10^{-5}$ | $3.6 \times 10^{-14}$ | $<7.2 \times 10^{-5}$ | $<4.7 \times 10^{-6}$ |
| 1% Temp. (° C.)*⁾ | 263 | 170 | 315 | 160 | 188 |
| Hindered Amine Light Stabilizer | | A | B | A | A |
| Haze (%) | | | | | |
| Initial | 5.7 | 5.5 | 4.5 | 5.8 | 5.0 |
| 80° C. × 7 days | 12.7 | 13.1 | 36.9 | 11.6 | 10.9 |
| UV Absorbance (%) | | | | | |
| Initial | 67.5 | 63.6 | 66.9 | 87.8 | 86.3 |
| 80° C. × 7 days | 82.3 | 74.9 | 57.4 | 23.1 | 51.4 |
| Retention (%) | 94.1 | 69.4 | 64.6 | 26.3 | 59.6 |

*⁾ "1% Temp." means a temperature at which the rate of the thermogravimetric change of a compound reaches 1%.

As shown in Table 1, the film containing the benzotriazole UV absorber according to the present invention maintains high UV absorption performance even when stored at 80° C. for 7 days, having a UV absorbance retention of about 65 to 95%, to exhibit satisfactory duration of the effect in preventing fading and deterioration. The blooming of the UV absorber is below an acceptable degree as can be seen from the not so great increase in haze of the film. Further, the degree of blooming is not so high under the processing conditions.

While the invention has been described in detail and with reference to specific examples thereof, it will be apparent to one skilled in the art that various changes and modifications can be made therein without departing from the spirit and scope thereof.

What is claimed is:

1. A polyolefin-based film comprising:
   (a) a polyolefin,
   (b) a benzotriazole ultraviolet absorber having a molecular weight of from 380 to 1,000, and
   (c) a hindered amine light stabilizer having a molecular weight of 1000 or more.

2. The film according to claim 1, wherein said hindered amine light stabilizer is a polyethylene resin having been copolymerized with 1 to 10% by weight of a hindered amine light stabilizer having an unsaturated group.

3. The film according to claim 1 or 2, wherein the rate of change in weight of the benzotriazole ultraviolet absorber measured by thermogravimetric analysis reaches 1% at a temperature of 200° C. or higher.

4. The film according to claim 1 or 2, wherein said polyolefin is a polypropylene resin.

5. The film according to claim 1 or 2, wherein said benzotriazole ultraviolet absorber is present in an amount of from 0.01 to 10 parts by weight per 100 parts by weight of the polyolefin.

6. The film according to claim 1 or 2, wherein said hindered amine light stabilizer is present in an amount of from 0.01 to 10 parts by weight per 100 parts by weight of the polyolefin.

7. The film according to claims 1 or 2, having a thickness of from 0.05 to 1 mm.

8. A decorative sheet comprising a printed film which comprises a film according to claim 1 or 2 and one surface of which is printed.

9. A decorative sheet comprising a colored film which comprises a film according to claim 1 or 2.

10. A decorative sheet which comprises a film according to claim 1 or 2 having provided thereon an adhesive layer and a layer subjected to at least one of printing and coloring.

11. A decorative material which comprises a substrate having provided thereon an adhesive layer and a decorative sheet according to claim 8.

12. A decorative material which comprises a substrate having provided thereon an adhesive layer and a decorative sheet according to claim 9.

13. A decorative material which comprises a substrate having provided thereon an adhesive layer and a decorative sheet according to claim 10.

14. The film according to either claim 1 or 2, wherein said benzotriazole ultraviolet absorber has a molecular weight of from 380 to 800.

15. The film according to either claim 1 or 2, wherein said benzotriazole ultraviolet absorber has a molecular weight of from 380 to 659.

16. The film according to either claim 1 or 2, wherein said film has a UV absorbance retention of about 64% to 95%.

* * * * *